(12) United States Patent
Liu et al.

(10) Patent No.: US 8,936,376 B2
(45) Date of Patent: Jan. 20, 2015

(54) FIXING DEVICE AND DISPLAY HAVING THE FIXING DEVICE

(71) Applicant: Wistron Corporation, New Taipei (TW)

(72) Inventors: Yang-Shang Liu, New Taipei (TW); Te-Hsiung Hsieh, New Taipei (TW)

(73) Assignee: Wistron Corporation, New Taipei (TW)

( * ) Notice: Subject to any disclaimer, the term of this patent is extended or adjusted under 35 U.S.C. 154(b) by 179 days.

(21) Appl. No.: 13/842,060

(22) Filed: Mar. 15, 2013

(65) Prior Publication Data

US 2014/0169022 A1   Jun. 19, 2014

(30) Foreign Application Priority Data

Dec. 14, 2012   (TW) .................... 2012 2 0695831 U

(51) Int. Cl.
*F21V 21/00*   (2006.01)
*F21V 8/00*   (2006.01)
*G09F 9/305*   (2006.01)

(52) U.S. Cl.
CPC .............. *G02B 6/0096* (2013.01); *G09F 9/305* (2013.01)

USPC ............. 362/217.11; 362/217.13; 362/217.17

(58) Field of Classification Search
CPC .......................... G02F 1/133608; G02B 6/009
USPC .................... 362/581, 217.1, 217.11, 217.12, 362/217.13, 217.17, 656, 374, 396
See application file for complete search history.

(56) References Cited

U.S. PATENT DOCUMENTS

| | | | | |
|---|---|---|---|---|
| 7,473,023 | B2 * | 1/2009 | Chun et al. ..................... | 362/634 |
| 7,993,028 | B2 * | 8/2011 | Wu ............................... | 362/269 |
| 2011/0317415 | A1 * | 12/2011 | Yamanaka .................... | 362/235 |

* cited by examiner

*Primary Examiner* — Vip Patel
(74) *Attorney, Agent, or Firm* — Muncy, Geissler, Olds & Lowe, P.C.

(57) ABSTRACT

The fixing device of the present invention comprises a base, at least one light guide pillar, and at least one light-blocking element. The base comprises at least one through hole, which obliquely penetrates the base. The at least one light guide pillar is disposed on the base. The at least one light-blocking element corresponds to the at least one through hole; therefore, when the at least one light-blocking element passes through the at least one through hole, the base and the light guide pillar are fixed by the at least one light-blocking element.

14 Claims, 4 Drawing Sheets

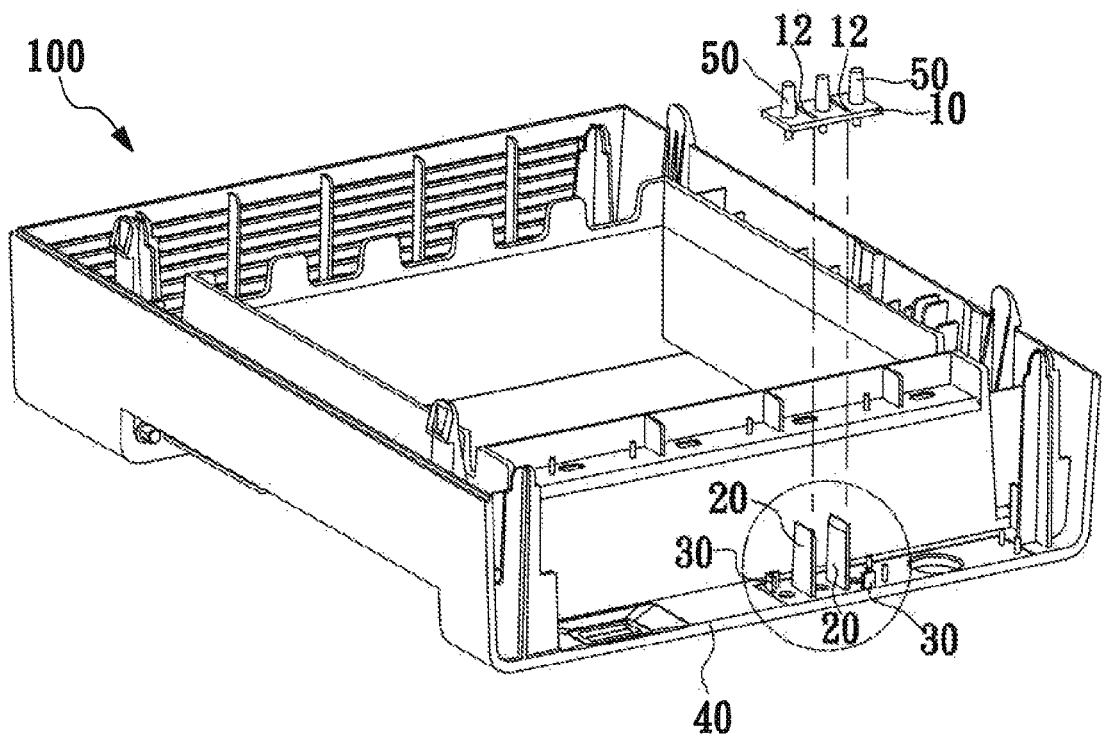
FIG. 1A
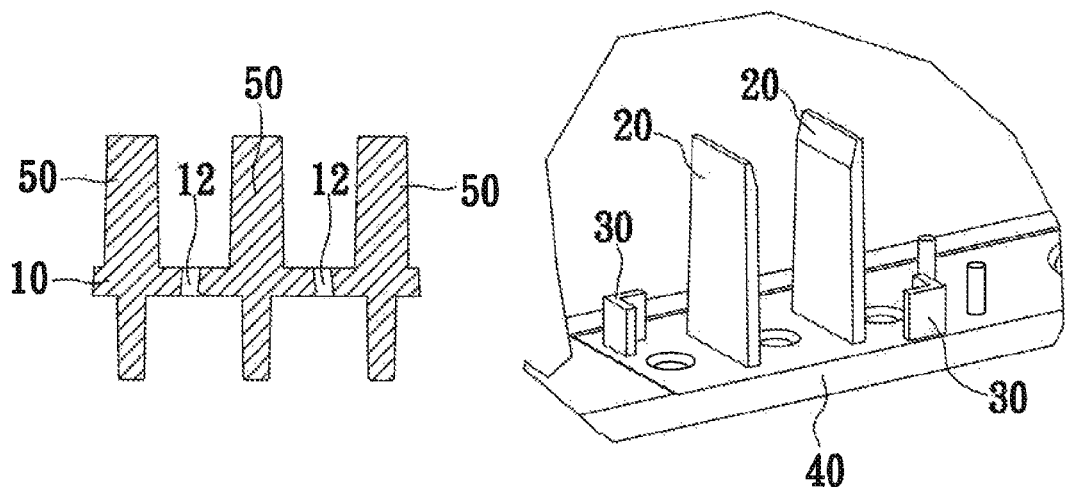
FIG. 1B
FIG. 1C

FIXING DEVICE AND DISPLAY HAVING THE FIXING DEVICE

BACKGROUND OF THE INVENTION

1. Field of the Invention

The present invention relates to a fixing device and a display having the fixing device, and more particularly, to a fixing device and a display which allows a light guide pillar to be fixed without external fixing structures.

2. Description of the Related Art

Employing thermal melting or hooks to fix a light guide pillar of a display are common fixing methods in the prior art technique. In the thermal melting method, a thermal melting structure needs to be added to the light guide pillar and corresponding hook structures have to be added for engaging with the hooks. Although the abovementioned fixing methods can achieve the aim of fixing the light guide pillar, the adding the fixing structures increases the manufacturing cost and the manufacturing time, which is not economical. As a result, the methods for fixing a light guide pillar in the prior art need to be improved.

Therefore, it is necessary to provide a fixing device and a display having the fixing device in which the light guide pillar is fixed without employing any additional fixing structures to solve the problem of the prior art.

SUMMARY OF THE INVENTION

It is an object of the present invention to provide a fixing device for fixing a light guide pillar without external fixing structures.

It is another object of the present invention to provide a display in which a light guide pillar can be fixed without external fixing structures.

In order to achieve the above objects, the fixing device of the present invention comprises a base, at least one light guide pillar, and at least one light-blocking element. The base comprises at least one through hole, which obliquely penetrates the base. The at least one light guide pillar is disposed on the base. The at least one light-blocking element corresponds to the at least one through hole; therefore, when the at least one light-blocking element passes through the at least one through hole, the base and the light guide pillar are fixed by the at least one light-blocking element.

According to an embodiment of the present invention, the fixing device further comprises at least two position limiting elements, which are disposed at two sides of the light-blocking element respectively, for supporting the base by contacting at least one part of the base.

The present invention further provides a display comprising a casing and a fixing device. The fixing device comprises a base, at least one light guide pillar, and at least one light-blocking element. The base comprises at least one through hole, which obliquely penetrates the base. The at least one light guide pillar is disposed on the base. The at least one light-blocking element corresponds to the at least one through hole, such that when the at least one light-blocking element passes through the at least one through hole, the base and the light guide pillar are fixed by the at least one light-blocking element.

BRIEF DESCRIPTION OF THE DRAWINGS

FIG. 1A is a schematic drawing of a first embodiment of the display and the fixing device of the present invention.

FIG. 1B illustrates a sectional drawing of the first embodiment of the light guide pillar of the present invention.

FIG. 1C is a partly enlarged schematic drawing of FIG. 1.

DETAILED DESCRIPTION OF THE PREFERRED EMBODIMENT

Figure 2A:
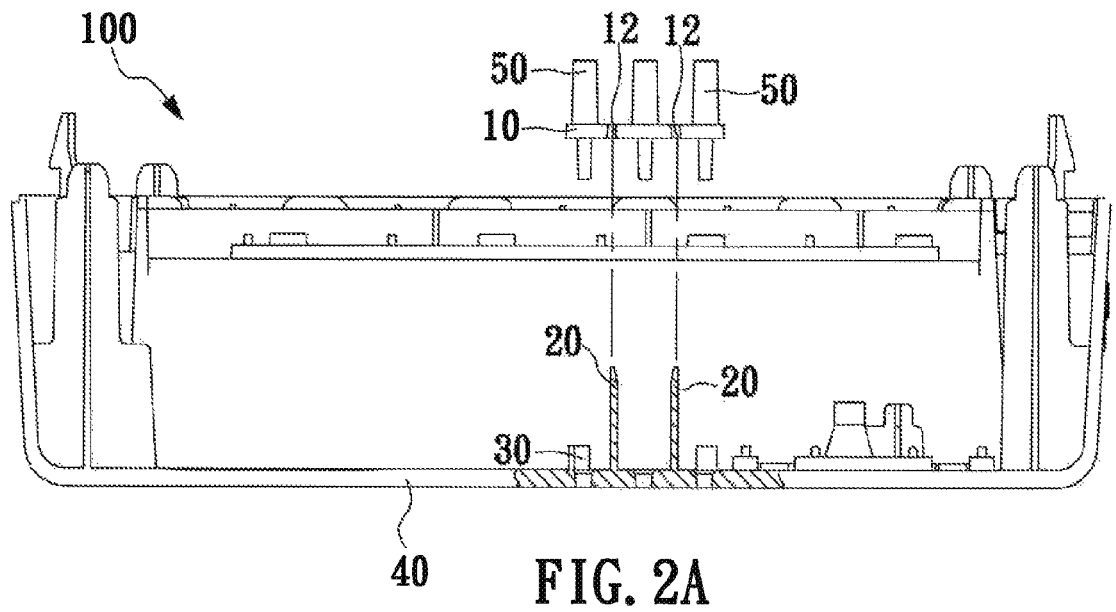
FIG. 2A is a sectional drawing illustrating the light guide pillar of the present invention not yet connected with the light-blocking element.

The advantages and innovative features of the invention will become more apparent from the following detailed description when taken in conjunction with the accompanying drawings.

Please refer to FIG. 1A, FIG. 1B, and FIG. 1C, which illustrate the first embodiment of the display and the fixing device of the present invention, wherein FIG. 1A is a schematic drawing of the first embodiment of the display and the fixing device of the present invention; FIG. 1B illustrates a sectional drawing of the first embodiment of the light guide pillar of the present invention; FIG. 1C is a partly enlarged schematic drawing of FIG. 1.

As shown in FIG. 1A, the display 100 of the present invention comprises a fixing device and a casing 40. In this embodiment, the fixing device comprises a base 10, two light-blocking elements 20, two position limiting elements 30, and a light guide pillar 50. As shown in FIG. 1B, the base 10 in this embodiment comprises two through holes 12, wherein each through hole 12 obliquely penetrates the base 10 and corresponds to the location of the two light-blocking elements 20. As shown in FIG. 1A, the through hole 12 is employed for allowing the light-blocking element 20 to pass through it so as to connect the light-blocking element 20 and the base 10. Therefore, the base 10 and the light-blocking element 20 press against each other and the base 10 and the light guide pillar 50 are fixed consequently.

As shown in FIG. 1B and FIG. 1C, the top end of the light-blocking element 20 and the through hole 12 both have a chamfer disposed thereon for facilitating the passage of the light-blocking element 20 through the corresponding through hole 12. As shown in FIG. 1C, the two light-blocking elements 20 and the two position limiting elements 30 are both disposed inside the casing 40. In addition, the two position limiting elements 30 are diagonally disposed at two sides of the light-blocking element 20. Meanwhile, the quantity of the through holes 12, the light-blocking elements 20, and the position limiting elements 30 may vary according to actual conditions. The present invention is not limited to this embodiment; the quantity of the through holes 12, the light-blocking elements 20, and the position limiting elements 30 can be one. Furthermore, as long as the light-blocking element 20 can pass through the through hole 12, there is no specific limitation of the size of the through hole 12.

Figure 2B:
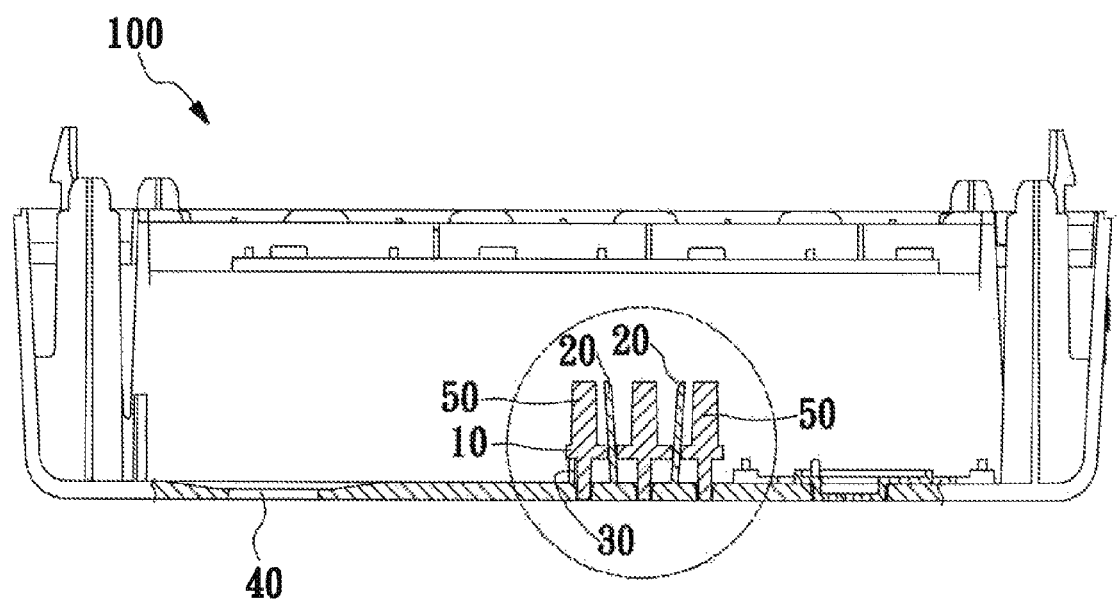
FIG. 2B is a schematic drawing illustrating the light guide pillar connected with the light-blocking element.

Please refer to FIG. 2A and FIG. 2B, wherein FIG. 2A is a sectional drawing of the light guide pillar of the present invention not yet connected with the light-blocking element; FIG. 2B is a schematic drawing of the light guide pillar connected with the light-blocking element.

As shown in FIG. 2A, the method for connecting the base 10 and the light-blocking element 20 is to make the light-blocking element 20 pass through the corresponding through hole 12. After part of the light-blocking element 20 passes through the corresponding through hole 12, the light-blocking element 20 is slightly inclined after connecting with the base 10. Therefore, a state illustrated in FIG. 2B is formed when the through hole 12 obliquely penetrates the base 10 due to the resiliency of the material used in the light-blocking element 20. It is noted that, after the base 10 has connected with the light-blocking element 20, part of the position limiting element 30 contacts part of the base 10 to support the base 10 such that the base 10 is suspended and makes no contact with the casing 40.

Figure 3A:
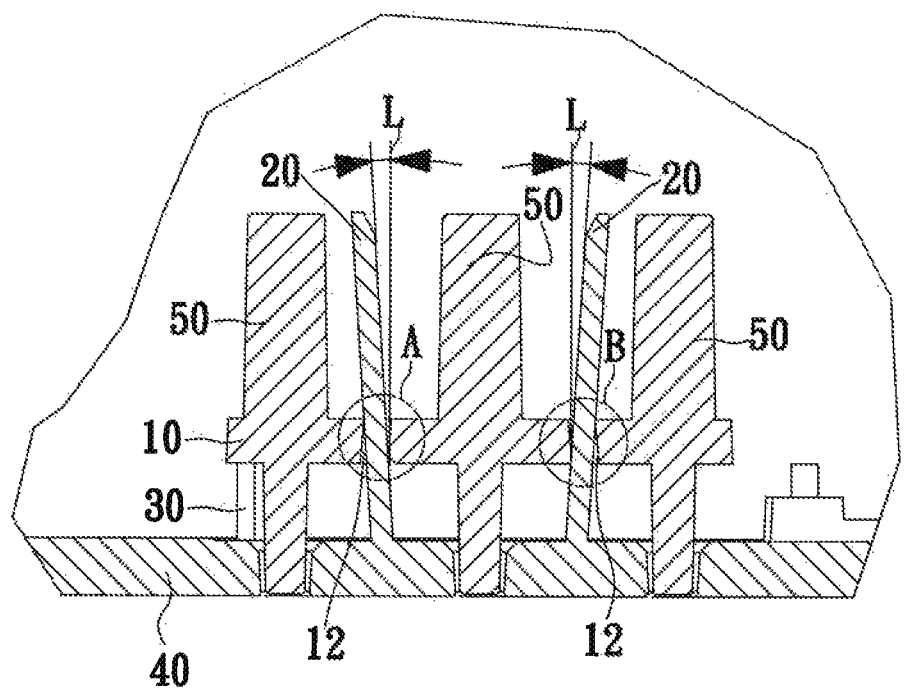
FIG. 3A is a sectional drawing of the fixing device.
Figure 3B:
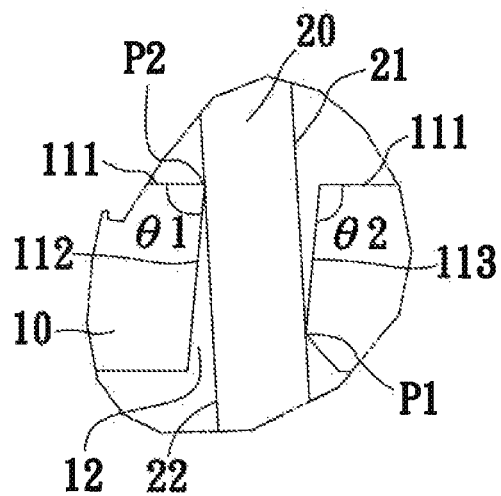
FIG. 3B is a partly enlarged schematic drawing of the A zone in FIG. 3.
Figure 3C:
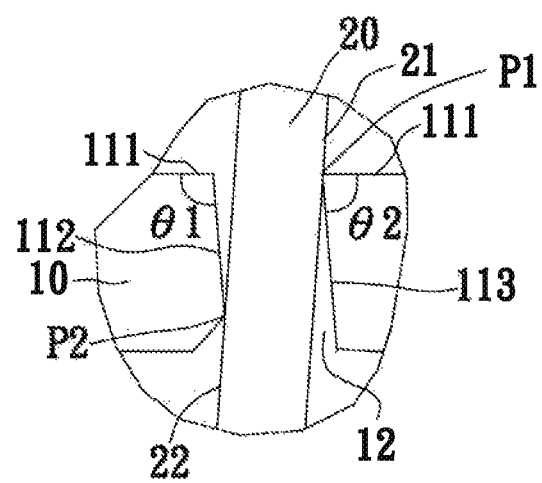
FIG. 3C is a partly enlarged schematic drawing of the B zone in FIG. 3.

Please refer to FIG. 3A, FIG. 3B, and FIG. 3C, wherein FIG. 3A is a sectional drawing of the fixing device; FIG. 3B is a partly enlarged schematic drawing of the A zone in FIG. 3; FIG. 3C is a partly enlarged schematic drawing of the B zone in FIG. 3.

As shown in FIG. 3A, after part of the light-blocking element 20 passes through the corresponding through hole 12, the light-blocking element 20 inside the through hole 12 interferes with the base 10 because the through hole 12 is obliquely disposed, and consequently the light-blocking element 20 slightly inclines. As a result, the light-blocking element 20 is off the vertical line L of the light-blocking element 20 and presses against the base 10 such that the base 10 and the light guide pillar 50 are fixed.

It is noted that the offset of the light-blocking element 20 off the vertical line L is affected by the width, cross-section, and the material of the light-blocking element 20. Hence, light-blocking elements 20 made in various sizes and of various materials will have different offsets. It is noted that the light-blocking element 20 in this embodiment is made of Acrylonitrile-Butadiene-Styrene; however, the present invention is not limited to this material.

As shown in FIG. 3B, the light-blocking element 20 comprises a first sidewall 21 and a second sidewall 22 opposite to the first sidewall 21. The base 10 comprises a first contact point P1 and a second contact point P2. After part of the light-blocking element 20 passes through the corresponding through hole 12, the first contact point P1 presses against the first sidewall 21 and the second contact point P2 presses against the second sidewall 22 such that the base 10 interferes with the light-blocking element 20 such that the base 10 and the light guide pillar 50 are fixed.

Moreover, as shown in FIG. 3B and FIG. 3C, the base 10 further comprises a first surface 111. At the two sides of the through hole 12, the base 10 further comprises a second surface 112 and a third surface 113 opposite to the second surface 112. Therefore, a first inclined angle $\theta_1$ is formed by the second surface 112 and the first surface 111; a second inclined angle $\theta_2$ is formed by the third surface 113 and the first surface 111, wherein the first inclined angle $\theta_1 \leq 89°$; the second inclined angle $\theta_2 \geq 91°$; or the sum of the angle of the first inclined angle $\theta_1$ and the angle of the second inclined angle $\theta_2$ is 180°. As long as the first contact point P1 can contact with the first sidewall 21 and the second contact point P2 can contact with the second sidewall 22 after the light-blocking element 20 passes through the corresponding through hole 12 to generate the interference between the base 10 and the light-blocking element 20, the present invention is not limited to the abovementioned ranges.

Figure 4:
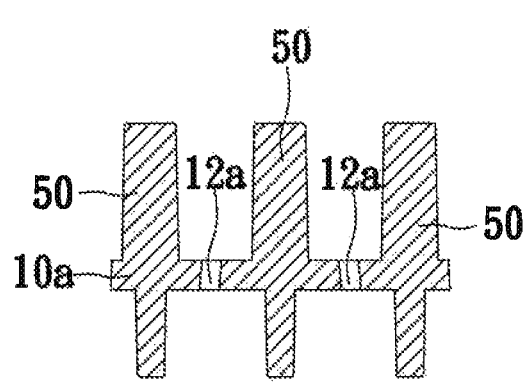
FIG. 4 is a sectional drawing of a second embodiment of the light guide pillar of the present invention.
Figure 5:
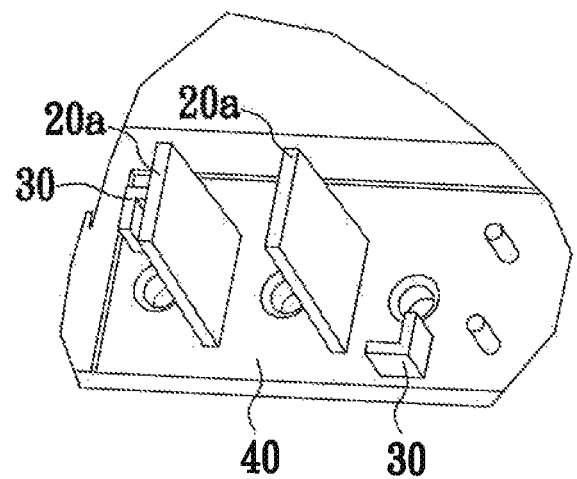
FIG. 5 is a schematic drawing of the light-blocking element of present invention.
Figure 6:
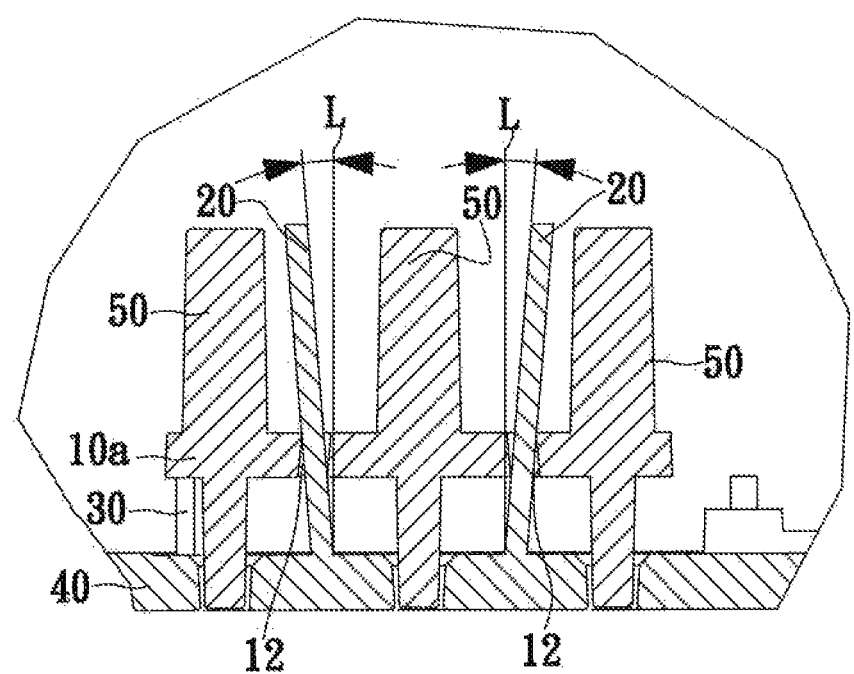
FIG. 6 is a sectional drawing of the second embodiment of the fixing device.

Please refer to FIG. 4, FIG. 5, and FIG. 6, wherein FIG. 4 is a sectional drawing of the second embodiment of the light guide pillar of the present invention; FIG. 5 is a schematic drawing of the light-blocking element of the present invention; FIG. 6 is a sectional drawing of the second embodiment of the fixing device.

As shown in FIG. 4 and FIG. 5, the greatest distinguishing difference between this embodiment and the first embodiment is that no chamfer is disposed at the top of the light-blocking element 20a or the through hole 12a of the base 10a. Without chamfers, the connection between the base 10a and the light-blocking element 20a must be accomplished manually. The positioning of the through hole 12a and the light-blocking element 20a has to be completed by hand by technicians for facilitating the passage of the light-blocking element 20a through the inclined through hole 12a. The details of the structures of the light-blocking element 20a, the base 10a, and a state in which the light-blocking element 20a is connected with the base 10a are the same as those of the first embodiment; please refer to FIG. 6 and the related description of the first embodiment.

The present invention employs the inclined through holes 12, 12a of the bases 10, 10a and the resiliency of the material of the light-blocking elements 20, 20a to allow the bases 10, 10a to interfere with the light guide pillar 50 without the addition of any fixing elements. As a result, the bases 10, 10a and the light guide pillar 50 can be fixed without thermal melting or hooks, which achieves the aim of reducing the manufacturing cost and the assembly time.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A fixing device comprising:
    a base having at least one through hole, the at least one through hole obliquely penetrating the base;
    at least one light guide pillar disposed on the base; and
    at least one light-blocking element corresponding to the at least one through hole; such that when the at least one light-blocking element passes through the at least one through hole, the base and the light guide pillar are fixed by the at least one light-blocking element.

2. The fixing device as claimed in claim 1, wherein after the at least one light-blocking element passes through the at least one through hole, the at least one light-blocking element is substantially off the vertical line of the at least one light-blocking element.

3. The fixing device as claimed in claim 2, wherein the fixing device further comprises at least two position limiting elements, and the at least two position limiting elements are disposed at two sides of the light-blocking element respectively, for supporting the base by contacting at least one part of the base.

4. The fixing device as claimed in claim 2, the at least one light-blocking element comprising a first sidewall and a second sidewall opposite to the first sidewall, and the base comprising a first contact point and a second contact point, wherein after part of the at least one light-blocking element passes through the at least one through hole, the first contact point contacts the first sidewall and the second contact point contacts the second sidewall.

5. The fixing device as claimed in claim 4, wherein the base has a first surface, and at the two sides of the at least one through hole, the base further has a second surface and a third surface opposite to the second surface, wherein the second surface and the first surface form a first inclined angle $\theta_1$; the third surface and the first surface form a second inclined angle $\theta_2$; the first inclined angle $\theta_1 \leq 89°$, and the second inclined angle $\theta_2 \geq 91°$.

6. The fixing device as claimed in claim 5, wherein a sum of the angle of the first inclined angle $\theta_1$ and the angle of the second inclined angle $\theta_2$ is 180.

7. The fixing device as claimed in claim 2, the at least one through hole being a plurality of through holes and the at least one light-blocking element being a plurality of light-blocking elements, wherein a location of each light-blocking element corresponds to the location of each of the plurality of through holes to allow each light-blocking element to pass through a corresponding through hole.

8. A display comprising:
   a casing;
   a fixing device, comprising:
      a base having at least one through hole, the at least one through hole obliquely penetrating the base;
      at least one light guide pillar disposed on the base; and
      at least one light-blocking element corresponding to the at least one through hole; such that when the at least one light-blocking element passes through the at least one through hole, the base and the light guide pillar are fixed by the at least one light-blocking element.

9. The display as claimed in claim 8, wherein after the at least one light-blocking element passes through the at least one through hole, the at least one light-blocking element is substantially off the vertical line of the at least one light-blocking element.

10. The display as claimed in claim 9, wherein the fixing device further comprises at least two position limiting elements, which are disposed at two sides of the light-blocking element respectively for supporting the base by contacting at least one part of the base.

11. The display as claimed in claim 9, the at least one light-blocking element comprising a first sidewall and a second sidewall opposite to the first sidewall, and the base comprising a first contact point and a second contact point, wherein after part of the at least one light-blocking element passes through the at least one through hole, the first contact point contacts the first sidewall and the second contact point contacts the second sidewall.

12. The display as claimed in claim 11, the base comprising a first surface, and at the two sides of the at least one through hole, the base further comprising a second surface and a third surface opposite to the second surface, wherein the second surface and the first surface form a first inclined angle $\theta_1$; the third surface and the first surface form a second inclined angle $\theta_2$; the first inclined angle $\theta_1 \leq 89°$, and the second inclined angle $\theta_2 \geq 91°$.

13. The display as claimed in claim 12, wherein the sum of the angle of the first inclined angle θ1 and the angle of the second inclined angle θ2 is 180°.

14. The display as claimed in claim 9, the at least one through hole being a plurality of through holes and the at least one light-blocking element being a plurality of light-blocking elements, wherein the location of each light-blocking element corresponds to the location of each of the plurality of through holes to allow each light-blocking element to pass through a corresponding through hole.

* * * * *